(12) United States Patent
Stolyarov et al.

(10) Patent No.: US 11,097,492 B2
(45) Date of Patent: Aug. 24, 2021

(54) THERMOPLASTIC COMPOSITES COMPRISING WATER-SOLUBLE PEO GRAFT POLYMERS USEFUL FOR 3-DIMENSIONAL ADDITIVE MANUFACTURING

(71) Applicant: GRAPHENE 3D LAB INC., Calverton, NY (US)

(72) Inventors: Daniel Stolyarov, Baiting Hollow, NY (US); Irina Pomestchenko, Mt. Sinai, NY (US)

(73) Assignee: G6 MATERIALS CORP., Ronkonkoma, NY (US)

( * ) Notice: Subject to any disclaimer, the term of this patent is extended or adjusted under 35 U.S.C. 154(b) by 534 days.

(21) Appl. No.: 15/555,253

(22) PCT Filed: Feb. 29, 2016

(86) PCT No.: PCT/US2016/020031
§ 371 (c)(1),
(2) Date: Sep. 1, 2017

(87) PCT Pub. No.: WO2016/140906
PCT Pub. Date: Sep. 9, 2016

(65) Prior Publication Data
US 2018/0050495 A1 Feb. 22, 2018

Related U.S. Application Data

(60) Provisional application No. 62/126,962, filed on Mar. 2, 2015.

(51) Int. Cl.
*B29C 64/40* (2017.01)
*B33Y 70/00* (2020.01)
(Continued)

(52) U.S. Cl.
CPC .............. *B29C 64/40* (2017.08); *B33Y 70/00* (2014.12); *C08J 5/04* (2013.01); *C08J 5/041* (2013.01);
(Continued)

(58) Field of Classification Search
CPC ..... B29C 64/40; B29C 64/112; B29C 64/118; B29C 64/135; C08K 3/22; C08K 5/06;
(Continued)

(56) References Cited

U.S. PATENT DOCUMENTS

| 2,702,250 A | 2/1955 | Miller |
| 3,558,411 A | 1/1971 | Beelien |

(Continued)

FOREIGN PATENT DOCUMENTS

| WO | WO-9934043 A1 * | 7/1999 | ............ C08L 71/02 |
| WO | WO 2013010211 | 1/2013 | |

(Continued)

OTHER PUBLICATIONS

PEO and Vinyl Polymer Prices from Sigma Aldrich (Year: 2019).*
(Continued)

*Primary Examiner* — Francisco W Tschen
*Assistant Examiner* — Guy F Mongelli
(74) *Attorney, Agent, or Firm* — Mark Malek; Paul Ditmyer; Widerman Malek, PL (57) ABSTRACT

Water-soluble thermoplastic polymer composites of water-soluble thermoplastic polyethylene oxide graft polymers, and nanoscopic particulate processing aids such nanoscopic titanium dioxide powders, or water-soluble polyethylene oxide graft polymers, structural reinforcement materials such as carbon or glass fibers, and plasticizers. These water-soluble thermoplastic polymer composites may be useful in preparing, for example, three-dimensional (3D)
(Continued)

sacrificial supports, vapor sensors, as well as other three-dimensional (3D) articles, objects, or parts.

16 Claims, 2 Drawing Sheets

(51) Int. Cl.
| | | |
|---|---|---|
| C08J 5/04 | (2006.01) | |
| C08K 3/22 | (2006.01) | |
| C08K 5/06 | (2006.01) | |
| B33Y 10/00 | (2015.01) | |
| B29C 64/112 | (2017.01) | |
| B29C 64/118 | (2017.01) | |
| B29C 64/135 | (2017.01) | |
| B29K 71/00 | (2006.01) | |
| B29K 105/16 | (2006.01) | |
| B29K 509/02 | (2006.01) | |

(52) U.S. Cl.
CPC ............ *C08J 5/042* (2013.01); *C08K 3/22* (2013.01); *C08K 5/06* (2013.01); *B29C 64/112* (2017.08); *B29C 64/118* (2017.08); *B29C 64/135* (2017.08); *B29K 2071/02* (2013.01); *B29K 2105/162* (2013.01); *B29K 2509/02* (2013.01); *B29K 2995/0062* (2013.01); *B29K 2995/0088* (2013.01); *B33Y 10/00* (2014.12); *C08K 2003/2241* (2013.01)

(58) Field of Classification Search
CPC ..... C08K 2003/2241; C08J 5/04; C08J 5/041; C08J 5/042; B33Y 70/00; B33Y 10/00; B29K 2071/02; B29K 2105/162; B29K 2509/02; B29K 2995/0062; B29K 2995/0088
See application file for complete search history.

(56) References Cited

U.S. PATENT DOCUMENTS

| | | | |
|---|---|---|---|
| 5,518,680 A | 5/1996 | Cima et al. | |
| 6,071,450 A * | 6/2000 | Topolkaraev | B29C 48/08 264/173.12 |
| 6,071,451 A * | 6/2000 | Wang | C08J 9/26 264/102 |
| 6,117,947 A * | 9/2000 | Wang | C08F 283/06 525/404 |
| 6,372,850 B2 * | 4/2002 | Wang | C08F 283/06 428/423.1 |
| 6,451,895 B1 * | 9/2002 | Topolkaraev | C08K 9/04 524/445 |
| 6,475,663 B1 | 11/2002 | Mohwald et al. | |
| 6,589,633 B1 * | 7/2003 | Ino | D06M 11/78 428/195.1 |
| 6,677,028 B1 * | 1/2004 | Lasch | B32B 27/40 359/529 |
| 6,790,403 B1 | 9/2004 | Priedeman, Jr. et al. | |
| 7,285,506 B2 | 10/2007 | Mardilovich et al. | |
| 7,582,328 B2 | 9/2009 | Rupich et al. | |
| 8,114,375 B2 | 2/2012 | Jang et al. | |
| 8,168,964 B2 | 5/2012 | Hiura et al. | |
| 8,222,190 B2 | 7/2012 | Zharmu et al. | |
| 8,222,321 B2 | 7/2012 | Youm et al. | |
| 8,257,867 B2 | 9/2012 | Liu et al. | |
| 8,287,699 B2 | 10/2012 | Shamu et al. | |
| 8,367,035 B2 | 2/2013 | Rogers et al. | |
| 8,487,296 B2 | 7/2013 | Grebel et al. | |
| 8,551,806 B2 | 10/2013 | Rueckes et al. | |
| 8,557,442 B2 | 10/2013 | Liu et al. | |
| 8,563,169 B2 | 10/2013 | Liu et al. | |
| 8,563,348 B2 | 10/2013 | Harris et al. | |
| 8,587,093 B2 | 11/2013 | Mardilovich et al. | |
| 8,628,167 B2 | 1/2014 | Nomura et al. | |
| 8,665,479 B2 | 3/2014 | Tan et al. | |
| 8,696,938 B2 | 4/2014 | Zhamu et al. | |
| 8,697,485 B2 | 4/2014 | Crain et al. | |
| 8,708,685 B2 | 4/2014 | Hickerson et al. | |
| 8,722,430 B2 | 5/2014 | Odagawa et al. | |
| 8,747,097 B2 | 6/2014 | Pettis | |
| 2001/0030383 A1 * | 10/2001 | Swanson | B29C 64/40 264/308 |
| 2003/0138732 A1 * | 7/2003 | Nagase | G03F 7/322 430/302 |
| 2003/0211293 A1 * | 11/2003 | Nemoto | B41M 5/506 428/195.1 |
| 2003/0215644 A1 * | 11/2003 | Deshpande | B05D 1/08 428/416 |
| 2003/0236588 A1 | 12/2003 | Jang et al. | |
| 2004/0258729 A1 * | 12/2004 | Czernuszka | A61L 27/46 424/426 |
| 2005/0070622 A1 * | 3/2005 | Kalgutkar | A61K 6/0017 522/1 |
| 2005/0074596 A1 * | 4/2005 | Nielsen | B29C 64/40 428/304.4 |
| 2005/0148258 A1 * | 7/2005 | Chakravarty | A61F 13/532 442/327 |
| 2007/0027213 A1 * | 2/2007 | Oberegger | A61K 9/2027 514/563 |
| 2007/0029693 A1 * | 2/2007 | Wigand | B33Y 30/00 264/113 |
| 2007/0191526 A1 * | 8/2007 | Jordan | A63B 37/0003 524/445 |
| 2007/0290419 A1 | 12/2007 | Goodman et al. | |
| 2008/0033118 A1 * | 2/2008 | Kobayashi | C08K 5/103 525/450 |
| 2008/0075774 A1 * | 3/2008 | Williams | A61K 9/2846 424/468 |
| 2008/0194736 A1 * | 8/2008 | Lu | C08J 5/005 524/35 |
| 2008/0306198 A1 * | 12/2008 | Zucchelli | C08L 23/16 524/394 |
| 2009/0104386 A1 | 4/2009 | Barrera et al. | |
| 2009/0286894 A1 | 11/2009 | Cooper-White | |
| 2010/0068270 A1 * | 3/2010 | Turchetta | C07C 225/16 424/468 |
| 2010/0170626 A1 | 7/2010 | Lochtman et al. | |
| 2010/0203128 A1 * | 8/2010 | Williams | A61K 9/2846 424/474 |
| 2010/0209687 A1 * | 8/2010 | Zhu | B82Y 30/00 428/220 |
| 2010/0219381 A1 | 9/2010 | Jeschke et al. | |
| 2010/0255094 A1 * | 10/2010 | Jackson | A61K 9/284 424/468 |
| 2010/0279100 A1 * | 11/2010 | Heikkila | C08K 7/28 428/313.9 |
| 2011/0028373 A1 * | 2/2011 | Fossum | C11D 3/0052 510/236 |
| 2011/0037033 A1 | 2/2011 | Green | |
| 2011/0049437 A1 | 3/2011 | Crain et al. | |
| 2011/0171364 A1 | 7/2011 | Xing et al. | |
| 2011/0260116 A1 | 10/2011 | Plee et al. | |
| 2011/0272646 A1 | 11/2011 | Meyer | |
| 2012/0039824 A1 * | 2/2012 | Archer | A61K 9/5192 424/59 |
| 2012/0244333 A1 | 9/2012 | Aksay et al. | |
| 2013/0071572 A1 * | 3/2013 | Tysak | C09D 133/08 427/389 |
| 2013/0115836 A1 * | 5/2013 | Touraud | B29C 70/465 442/59 |
| 2013/0316072 A1 | 11/2013 | Scordilis-Kelley et al. | |
| 2013/0320467 A1 | 12/2013 | Buchanan et al. | |
| 2014/0034214 A1 | 2/2014 | Boyer et al. | |
| 2014/0072833 A1 | 3/2014 | Loganathan et al. | |
| 2014/0121306 A1 * | 5/2014 | Ton-That | C08B 15/10 524/35 |
| 2014/0134335 A1 | 5/2014 | Pridoehl et al. | |
| 2014/0187424 A1 * | 7/2014 | Norton | A01N 53/00 504/101 |

(56) References Cited

U.S. PATENT DOCUMENTS

| | | | |
|---|---|---|---|
| 2014/0256863 A1* | 9/2014 | Shimazumi | C04B 35/632 524/394 |
| 2014/0323647 A1 | 10/2014 | Voit et al. | |
| 2014/0323847 A1 | 10/2014 | McCool | |
| 2014/0364310 A1* | 12/2014 | Li | A01N 47/24 504/101 |
| 2014/0370268 A1* | 12/2014 | Bowman | C09D 7/61 428/323 |
| 2015/0021816 A1* | 1/2015 | D'Cruz | C08L 15/02 264/236 |
| 2015/0028516 A1* | 1/2015 | Duong | H01M 50/411 264/173.19 |
| 2015/0028523 A1* | 1/2015 | Jaker | B29C 64/40 264/401 |
| 2015/0030644 A1* | 1/2015 | Oh | A61K 8/898 424/401 |
| 2015/0056318 A1* | 2/2015 | Ho | B29C 64/118 425/132 |
| 2015/0056415 A1* | 2/2015 | Southard | G02B 5/10 428/161 |
| 2015/0056421 A1* | 2/2015 | Yudovin-Farber | B33Y 10/00 428/201 |
| 2015/0151487 A1* | 6/2015 | Leighton | B29C 64/40 264/308 |

FOREIGN PATENT DOCUMENTS

| | | |
|---|---|---|
| WO | WO2013010211 | 1/2013 |
| WO | WO 2014015994 | 1/2014 |
| WO | WO 2014041323 | 3/2014 |
| WO | WO 2014/210584 | 12/2014 |
| WO | WO-2014210584 A1 * | 12/2014 ............... H01B 1/04 |
| WO | WO 2015/156877 | 11/2015 |
| WO | WO 2016/036607 | 3/2016 |
| WO | WO 2016140906 | 9/2016 |
| WO | WO 2017/019511 | 2/2017 |

OTHER PUBLICATIONS

Shimadzu NPL (https://web.archive.org/web/20140917161130/http://www.shimadzu.com/an/industry/foodbeverages/e8o1ci000000045u.htm, https://www.shimadzu.com/an/industry/foodbeverages/qn50420000001rmx-att/qn50420000001ro4.pdf) (Year: 2014).*

International Search Report (ISR) and Written Opinion of the International Search Authority (WOISA) (dated May 6, 2016) for PCT/US16/020031, 13 pages.

International Search Report and Written Opinion of the International Search Authority (dated Jan. 11, 2016) for PCT/US15/047516 12 pages.

International Search Report and Written Opinion of the International Search Authority (dated )Nov. 30, 15) for PCT/US15/011878, 10 pages.

International Search Report (ISR) and Written Opinion of the International Search Authority (WOISA) (dated Oct. 24, 2014) for PCT/US14/044768, 14 pages.

International Search Report (ISR) and Written Opinion of the International Search Authority (WOISA) (dated Nov. 29, 2016) for PCT/US16/043575, 15 pages.

Roy-Mayhew, "Functionalized Graphene Sheets in Dye-Sensitized Solar Cell Counter Electrodes," ACS Applied Materials & Interfaces, May 1, 2012 (2013 Dissertation), pp. 1-151.

"Graphene," Wikipedia at: http://en.wikipedia.org/wiki/Graphene, last checked May 15, 2014 (37 pages).

* cited by examiner

FIG. 1

FIG. 2

THERMOPLASTIC COMPOSITES COMPRISING WATER-SOLUBLE PEO GRAFT POLYMERS USEFUL FOR 3-DIMENSIONAL ADDITIVE MANUFACTURING

CROSS-REFERENCE TO RELATED APPLICATIONS

This application is a national stage application of PCT Application Serial Number PCT/US16/020031, filed Feb. 29, 2016, which makes reference to and claims the priority benefit of U.S. Provisional Patent Application No. 62/126,962, filed Mar. 2, 2015, the entire disclosure and contents of said PCT Application and said U.S Provisional Patent Application being hereby incorporated by reference in their entirety.

FIELD OF THE INVENTION

The present invention relates to water-soluble thermoplastic polymer composites comprising water-soluble polyethylene oxide graft polymers, and nanoscopic particulate processing aids such as titanium dioxide nanopowders. The present invention also relates to water-soluble thermoplastic polymer composites comprising water-soluble polyethylene oxide graft polymers, structural reinforcement materials such as carbon or glass fibers, and plasticizers. The present invention further relates to the use of these water-soluble thermoplastic polymer composites in preparing, for example, three-dimensional (3D) water-soluble prototypes, models, in casting molds for designing and printing three-dimensional (3D) articles that may require some sacrificial support material, in constructing customized biological scaffolds for bone and tissue regeneration, as well as for constructing printable vapor sensors.

BACKGROUND

Prototypes of objects, parts, molds, etc., may be used worldwide in a wide variety of technologies such as aerospace, automotive, pharmaceutical, biomedical, etc. Many different methods and strategies are also employed in such prototype manufacturing. For example, a prototype may be sculpted from a bulk material. In such cases, the prototype may be drawn manually of with the aid of computer-assisted software, and then machined or carved manually by removing extra material from a bulk piece. Such processing may require multiple iterations until a satisfactory prototype may be produced. Another approach would be to create a mold of the desired object, and then make a prototype of the object by filling the mold with the desired material, followed by processing or curing using an appropriate technique that would allow for the solid object to be produced. Multiple iterations may also be needed to create a successful mold for such object. Accordingly, both sculpting and molding of the prototype may be time-consuming and costly.

Another method for creating a prototype may be by so called "free-forming" where the formation of the three-dimensional object is achieved by sequentially depositing multiple layers of the fluid material onto a base. The fluid then solidifies layer-by-layer and determines the prototype shape. See, for example, U.S. Pat. No. 5,340,433 (Crump), issued Aug. 23, 1994, and U.S. Pat. No. 5,121,329 (Crump), issued Jun. 9, 1992, which describes one such method. In this method certain types of materials, such as waxes, are dispensed in such way that, upon solidification of the preceding layer, another layer of material is deposited on top of the solidified preceding layer. While seemingly convenient and lower cost, such methods may have restrictions in terms of the types of materials that may be processed. For example, lower melting viscosity waxes and certain thermosets may be employed in such methods, but the quality of the prototypes produced may not be optimal.

SUMMARY

In a first broad aspect of the present invention, there is provided a composition comprising a water-soluble thermoplastic polymer composite, comprising:
a water-soluble polyethylene oxide graft polymer having:
    a polyethylene oxide polymer backbone having an approximate molecular weight of at least about 4,000,000 g/mol.; and
    from about 0.05 to about 10% by weight of the polyethylene oxide polymer backbone of at least one polar vinyl monomer grafted to the polyethylene oxide polymer backbone; and
one or more nanoscopic particulate processing aids substantially uniformly dispersed in the graft polymer in an amount of from about 0.05 to about 10% by weight of the polymer composite;
wherein the polymer composite has a melt viscosity in the range of from about 100 to about 10000 Pa-sec. when measured at a shear rate in the range of from about $1 \times 10^1$ to about $1 \times 10^4$ reciprocal seconds.

In a second broad aspect of the present invention, there is provided a composition comprising a water-soluble thermoplastic polymer composite, comprising:
a water-soluble polyethylene oxide graft polymer having:
    a polyethylene oxide polymer backbone having an approximate molecular weight of at least about 4,000,000 g/mol.; and
    from about 0.05 to about 10% by weight of the polyethylene oxide polymer backbone of at least one polar vinyl monomer grafted to the polyethylene oxide polymer backbone; and
one or more structural reinforcement materials substantially uniformly dispersed in the graft polymer in an amount of from about 0.1 to about 20% by weight of the polymer composite;
one or more plasticizers substantially uniformly dispersed in the graft polymer in an amount of from about 0.1 to about 15% by weight of the polymer composite;
wherein the polymer composite has a melt viscosity in the range of from about 100 to about 10000 Pa-sec. when measured at a shear rate in the range of from about $1 \times 10^1$ to about $1 \times 10^4$ reciprocal seconds.

In a third broad aspect of the present invention, there is provided a method for preparing a three-dimensional article, which comprises the following steps of:
(a) providing a water-soluble thermoplastic polymer composite comprising:
    a water-soluble polyethylene oxide graft polymer having:
        a polyethylene oxide polymer backbone having an approximate molecular weight of at least about 4,000,000 g/mol.; and
        from about 0.05 to about 10% by weight of the polyethylene oxide polymer backbone of at least one polar vinyl monomer grafted to the polyethylene oxide polymer backbone; and one or more nanoscopic particulate processing aids substantially uniformly dispersed in the graft polymer in an amount of from about 0.05 to about 10% by weight of the polymer composite;

wherein the polymer composite has a melt viscosity in the range of from about 100 to about 10000 Pa-sec. when measured at a shear rate in the range of from about $1 \times 10^1$ to about $1 \times 10^4$ reciprocal seconds;

(b) forming the polymer composite of step (a) into a three-dimensional (3D) printable material; and (c) forming the three-dimensional (3D) printable material of step (b) by using a three-dimensional (3D) printing technique into a three-dimensional article.

In a fourth broad aspect of the present invention, there is provided a method for preparing a three-dimensional articles, which comprises the following steps of:

(a) providing a water-soluble thermoplastic polymer composite comprising:

a water-soluble thermoplastic polyethylene oxide graft polymer having:

a polyethylene oxide polymer backbone having an approximate molecular weight of at least about 4,000,000 g/mol.; and from about 0.05 to about 10% by weight of the polyethylene oxide polymer backbone of at least one polar vinyl monomer grafted to the polyethylene oxide polymer backbone; and one or more structural reinforcement materials substantially uniformly dispersed in the graft polymer in an amount of from about 0.1 to about 20% by weight of the polymer composite;

one or more plasticizers substantially uniformly dispersed in the graft polymer in an amount of from about 0.1 to about 15% by weight of the polymer composite;

wherein the polymer composite has a melt viscosity in the range of from about 100 to about 10000 Pa-sec. when measured at a shear rate in the range of from about $1 \times 10^1$ to about $1 \times 10^4$ reciprocal seconds;

(b) forming the polymer composite of step (a) into a three-dimensional (3D) printable material; and (c) forming the three-dimensional (3D) printable material of step (b) by using a three-dimensional (3D) printing technique into a three-dimensional article.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "water-soluble" refers to a composite, composition, substance, material, etc., which is soluble, or substantially soluble (e.g., melts, liquefies, dissolves, disintegrates, falls apart, solubilizes, etc.) when brought into contact with an aqueous fluid (e.g., water), for example, at ambient temperatures (e.g., room temperature, environmental temperature, etc.).

For the purposes of the present invention, the term "thermoplastic" refers to the conventional meaning of thermoplastic, i.e., a composition, compound, material, etc., that exhibits the property of a material, such as a high polymer, that softens or melts so as to become pliable, malleable, etc., when exposed to sufficient heat and generally returns to its original condition when cooled to room temperature.

For the purposes of the present invention, the term "polymer composite" refers to a composition comprising a water-soluble polyethylene oxide (PEO) graft polymer which provides the external or continuous (bulk) phase and in which is dispersed one or more other materials, substances, processing aids, etc., such as nanoscopic particulate processing aids, plasticizers, structural reinforcement materials, etc.

For the purposes of the present invention, the term "substantially uniformly dispersed" refers to a dispersion of a material, substance, compound, etc., in the bulk (continuous) phase (e.g., graft polymer) such that the bulk phase is substantially uniform in terms of composition, texture, characteristics, properties, etc.

For the purposes of the present invention, the term "graft polymer" refers to a copolymer comprised of a main polymer backbone which is modified by side chains of one or more polymerized monomers covalently bonded to (grafted on) the polymer backbone.

For the purposes of the present invention, the term "polyethylene oxide (PEO) graft polymer" (hereafter referred to interchangeably as "PEO graft polymer") refers to a copolymer comprised of a main polyethylene oxide (PEO) polymer backbone which is modified by side chains of one or more polymerized polar vinyl monomers covalently bonded to (grafted on) the polyethylene oxide (PEO) polymer backbone.

For the purposes of the present invention, the term "polyethylene oxide (PEO) polymer" (hereafter referred to interchangeably as "PEO polymer") refers to a water-soluble polyether polymer (also called poly(ethylene glycol) or poly(oxyethylene)) having an approximate molecular weight at least about 4,000,000 g/mol., for example, in the range of from about 4,000,000 to about 8,000,000 g/mol., such as from about 6,750,000 to about 7,250,000 g/mol. Suitable PEO polymers for use herein may include one or more of: Dow Chemical POLYOX water-soluble PEO resins such as WSR-303, WSR-308, WSR Coagulant, UCARFLOC Polymer 300, ULCARFLOC Polymer 302, ULCARFLOC Polymer 304, UCARFLOC Polymer 309, etc.; Sigma-Aldrich grades 189464, 189472 and 372838; etc.

For the purposes of the present invention, the term "polar vinyl monomer" refers to any ethylenically unsaturated monomers having polar functional groups (e.g., hydroxy, hydroxyalkyl, polyether, carboxyl, amino, carbonyl, halo, thiol, sulfonic, sulfonate, etc.) which may be grafted onto a PEO polymer backbone, such as, for example, hydroxyalkylacrylates, polyetheracrylates (e.g., poly(ethylene glycol) acrylates), hydroxyalkylmethacrylates, polyethermethacrylates, (e.g., poly(ethylene glycol)methacrylates), vinyl acetate, acrylonitrile, etc. Suitable polar vinyl monomers for use herein may include one or more of: 2-hydroxyethyl methacrylate (HEMA); poly(ethylene glycol)methacrylate (PEG-MA); etc.

For the purposes of the present invention, the term "approximate molecular weight" refers to the approximate weight (in grams) of one mole of the PEO polymer molecules, based upon melt rheology measurements.

For the purposes of the present invention, the term "melt strength" refers to the resistance of the melted polymer composite to stretching and reflect how strong polymer composite is when in a molten state. Melt strength of the melted polymer composite is related to the molecular chain entanglements of the polymer in the composite and its resistance to untangling under strain. The polymer properties affecting such resistance to untangling include, for example, molecular weight, molecular-weight distribution (MWD), molecular branching, etc. As each of these properties increase, melt strength of the polymer may be improved at lower shear rates.

For the purposes of the present invention, the term "melt viscosity" refers to dynamic viscosity of the melted (e.g., molten) material as measured by a rheometer (e.g., a Discovery Hybrid Rheometer (DHR-2) made by TA Instruments), and depends upon the shear rate. For example, at higher shear rates, the melt viscosity of a material may be determined in an oscillation experiment by applying the Cox-Merz rule (see W. P. Cox, and E. H. Merz, *J. Polymer Science*, 28:619 (1958).

For the purposes of the present invention, the term "viscoelasticity" and "elastic viscosity" refer interchangeably to the property of materials which exhibit both viscous and elastic characteristics when undergoing deformation. Viscous materials resist shear flow and strain linearly with time when a stress is applied, while elastic materials strain instantaneously when stretched and just as quickly return to their original state once the stress is removed. Viscoelastic materials have elements of both of these properties and, as such, exhibit time dependent strain. Whereas elasticity is usually the result of bond stretching along crystallographic planes in an ordered solid, viscoelasticity is the result of the diffusion of atoms or molecules inside of a material.

For the purposes of the present invention, the term "shear rate" refers to rate at which a progressive shearing deformation is applied to a material (as measured by a rheometer) and is defined in units of reciprocal seconds (1/sec.).

For the purposes of the present invention, "plasticizer" refers to the conventional meaning of this term as an agent which, for example, softens, makes more flexible, malleable, pliable, plastic, etc., a polymer, thus providing flexibility, pliability, durability, etc., which may also decrease the melting and the glass transition temperature of the polymer, and which may include, for example, one or more of: poly(ethylene glycol) dimethyl ether (PEGM); triethyl citrate; triacetin, propylene glycol; dibutyl sebacate; glycerol monostearate; diethyl phthalate; crown ethers (e.g., crown ethers formed from oligomers of ethylene oxide); poly(ethylene glycol) dimethylether; etc.

For the purposes of the present invention, the term "nanoscopic particulate processing aids" refers to nanoscopic particulate additives (e.g., nanoparticles, nanopowders, etc.) which alter the melt processability and handling properties (e.g., altering viscosity properties, etc.) of the polymer composite. Nanoscopic particulate processing aids useful herein may include nanoscopic particulates comprising, for example, one or more of: titanium dioxides ($TiO_2$); aluminum oxides ($Al_2O_3$), silicon oxides ($SiO_2$); fumed silica; other metal oxides such as zirconia, vanadia, chromia, antimony oxide, tin oxide, ceria, zinc oxide, etc., surface-modified nanoscopic particulates; etc.

For the purposes of the present invention, the term "structural reinforcement materials" refers to additives which may alter structural integrity and/or strength of the polymer. Structural reinforcement materials useful herein may include, for example, one or more of: carbon fibers; carbon nanotubes; glass fibers; metal or metal oxide fibers; clay; talc; chalk; boron nitride; magnesium hydroxide, magnesium carbonate, diatomaceous earth; mica; glass quartz; ceramic and/or glass microbeads or spheres; graphene; graphene nanoplatelets; graphene oxide; reduced graphene oxide, graphite; carbon black; other graphene-like materials; etc.

For the purposes of the present invention, the term "nanoscopic" refers to materials, substances, structures, etc., having a size in at least one dimension (e.g., thickness) of from about 1 to about 1000 nanometers, such as from about 1 to about 100 nanometers. Nanoscopic materials, substances, structures, etc., may include, for example, nanoparticles; nanopowders; nanoplatelets, nanofibers, nanotubes, nanowhiskers, etc.

For the purposes of the present invention, the term "carbon material" material refers to materials made of carbon. Carbon materials may include one or more of: graphite; graphite flakes; carbon black; graphene; graphene-like materials; (e.g., reduced graphene oxide, functionalized graphene, graphene oxide, partially reduced graphene oxide, etc.); carbon-based nanofibers; carbon-based nanotubes; etc.

For the purposes of the present invention, the term "graphene-like material" refers to a material, substance, etc., which may have a layered structure the same or similar to graphene. Graphene-like materials may include one or more of: graphene; graphene nanoplatelets; functionalized graphene; graphene oxide; reduced graphene oxide; partially reduced graphene oxide; etc.

For the purposes of the present invention, the term "graphene" refers to pure or relatively pure carbon in the form of a relatively thin, nearly transparent sheet, which is one atom in thickness (i.e., a monolayer sheet of carbon), or comprising multiple layers (multilayer carbon sheets), having a plurality of interconnected hexagonal cells of carbon atoms which form a honeycomb like crystalline lattice structure. In addition to hexagonal cells, pentagonal and heptagonal cells (defects), versus hexagonal cells, may also be present in this crystal lattice.

For the purposes of the present invention, the term "functionalized graphene" refers to graphene which has incorporated into the graphene lattice a variety chemical functional groups such as —OH, —COOH, $NH_2$, etc., in order to modify the properties of graphene.

For the purposes of the present invention, the term "graphene oxide" (also known as "graphitic acid" and "graphite oxide") refers interchangeably to a compound of carbon, oxygen, and hydrogen which may exist in variable ratios of these three atoms, and which may be obtained by treating graphite with strong oxidizers.

For the purposes of the present invention, the term "partially reduced graphene oxide" refers to graphene oxide that, upon reduction, contains from about 5 about 30% oxygen by weight of the graphene oxide.

For the purposes of the present invention, the terms "graphene platelets" and "graphene sheets" refer interchangeably to platelets of graphene comprising one or more layers of a two-dimensional (2D) graphene plane, and may also refer to platelets and sheets comprised of graphene oxide, partially reduced graphene oxide, functionalized graphene, etc.

For the purposes of the present invention, the term "graphene nanoplatelets (NGPs)" and "nanosheets" refer interchangeably to platelets of graphene, and may also refer to platelets and sheets comprised of graphene oxide, partially reduced graphene oxide, functionalized graphene, etc., having a thickness in the range of from about 0.34 to about 100 nm.

For the purposes of the present invention, the term "graphene-like nanoplatelets" refers to graphene-like materials having platelet characteristics the same or similar to graphene nanoplatelets (NGPs).

For the purposes of the present invention, the term "flakes" refers to particles in which two of the dimensions (i.e., width and length) are significantly greater compared to the third dimension (i.e., thickness).

For the purposes of the present invention, the term "graphite flakes" refers to graphite material in the form of flakes.

For the purposes of the present invention, the term "powder" refers to a solid material which is comprised of a large number of fine particles.

For the purposes of the present invention, the term "film" refers to a relatively thin continuous layer of material, and which may be supported on or by other materials, or which may be unsupported on or by other materials.

For the purposes of the present invention, the term "solvent" refers to a liquid which may dissolve or suspend another material which may be a solid, gas, or liquid.

For the purposes of the present invention, the term "compatible solvent" refers to a solvent which may provide an effective medium for the formation of a solution or dispersion of one or more solutes without significant detrimental effects to the other components present in the solution or dispersion, e.g., is miscible.

For the purposes of the present invention, the term "high boiling solvent" refers to refers to a solvent which boils at or near a temperature of greater than about 100° C. Suitable high boiling solvents for use herein may include, for example, one or more of: ethylene carbonate (EC); propylene carbonate (PC); diethyl carbonate (DEC); dimethyl carbonate (DMC); etc.

For the purposes of the present invention, the term "blend," "blending," and similar words and/or phrases refers to combining, mixing together, unifying, etc., a plurality of components, compounds, compositions, substances, materials, etc.

For the purposes of the present invention, the term "substantially uniformly dispersed" refers to a dispersion of a material, substance, compound, etc., in the bulk (continuous) phase (e.g., polymer) such that the bulk phase is substantially uniform in terms of composition, texture, characteristics, properties, etc.

For the purposes of the present invention, the term "structural support" refers to structures such as molds, forms, constructs, scaffolds, etc., which may provide permanent or temporary support in preparing three-dimensional objects, parts, etc.

For the purposes of the present invention, the term "solid" refers to refers to non-volatile, non-liquid components, compounds, materials, etc.

For the purposes of the present invention, the term "liquid" refers to a non-gaseous fluid components, compounds, materials, etc., which may be readily flowable at the temperature of use (e.g., room temperature) with little or no tendency to disperse and with a relatively high compressibility.

For the purposes of the present invention, the term "room temperature" refers to refers to the commonly accepted meaning of room temperature, i.e., an ambient temperature of from about 20° to about 25° C.

For the purposes of the present invention, the term "extrudable" refers to composites, composition, substance, material, etc., which is sufficiently malleable, pliable, thermoplastic, etc., such that it may be forced through an extrusion die to form, for example, filaments, threads, strands, fibers, films, pellets, etc.

For the purposes of the present invention, the term "fusible" refers to a thermoplastic composition, substance, material, etc., which may be fused, sintered, joined together, combined, etc., by the application of heat.

For the purposes of the present invention, the term "three-dimensional (3D) printable material" refers to a thermoplastic composition, substance, material, etc., which may be formed into a three-dimensional (3D) article, objects, parts, etc., by a three-dimensional (3D) printing technique.

For the purposes of the present invention, the term "three-dimensional (3D) printing" (also known as "additive printing" and "additive manufacturing") refers to any of various processes, techniques, etc. (e.g., coating, spraying, depositing, applying, extruding, fusing, sintering, etc., or any combination thereof) for making a three-dimensional (3D) article, object, part, etc. from a three-dimensional (3D) model, other electronic data source, etc., through additive processes in which successive layers of material (e.g., filaments, films, powders, particles, pellets, etc.) may be laid down, for example, under computer control. Three-dimensional (3D) printing processes, techniques, etc., may include, for example, fused filament fabrication (FFF) (also referred to herein interchangeably as fused deposition modeling (FDM) and fused extrusion deposition (FED)), selective laser sintering (SLS) (also referred to herein interchangeably as selective laser melting (SLM)), inkjet head 3D printing (also referred to herein interchangeably as inkjet 3D printing), etc.

For the purposes of the present invention, the term "sacrificial support" refers to a temporary removable support, mold, scaffold, construct, etc., which may be used to support, shape, etc., the formation of another three-dimensional (3D) article, object, part, etc., by a three-dimensional (3D) printing technique, or other method.

For the purposes of the present invention, the term "vapor sensor" refers to an electronic sensor which senses gaseous or volatile compositions, components, etc., such as water vapor, hydrocarbon vapors, carbon dioxide or carbon monoxide, organochlorides, alcohols, etc., and which may be hazardous, flammable, etc.

For the purposes of the present invention, the term "comprising" means various compounds, components, ingredients, substances, materials, layers, steps, etc., may be conjointly employed in embodiments of the present invention.

Accordingly, the term "comprising" encompasses the more restrictive terms "consisting essentially of" and "consisting of."

For the purposes of the present invention, the terms "a" and "an" and similar phrases are to be interpreted as "at least one" and "one or more." References to "an" embodiment in this disclosure are not necessarily to the same embodiment.

For the purposes of the present invention, the term "and/or" means that one or more of the various compositions, compounds, ingredients, components, elements, capabilities, steps, etc., may be employed in embodiments of the present invention.

Description

Manufacturing techniques such as fused filament fabrication (FFF) and related three-dimensional (3D) printing techniques may provide benefits in preparing prototypes of objects, parts, etc. FFF techniques involve extrusion of, for example, a thermoplastic filament through a nozzle onto a supporting base alongside or on the top of the same or a different material which may then be joined by heat and/or adhesion. Such FFF techniques may also use precise, computer-based controlled motion of the nozzle along three axes to thus allow layer by layer construction of a three-dimensional (3D) object.

In an FFF three-dimensional (3D) printing process, the polymer may be supplied to the extruder in form of filament, pellets, etc. The extruder may be kept at elevated temperatures sufficient to melt the polymer to form a softened or molten material. The softened or molten material is then pushed through extrusion orifice (die) under a force provided by a feeding mechanism. The temperature of the extruder, material feeding force, diameter of the extruder orifice and viscoelastic properties of the material determines the deposition rate of the extruded material. In an embodiment of a FFF printer, the diameter of the orifice of the extruder nozzle may be in the range of, for example, from about 0.3 to about 0.7 mm (e.g., around) 0.4 mm. The temperature of the extruder may be set, for example, in the range of from about 100° to about 300° C. (such as from about 150° to about 250° C.). During extrusion, the shear rate at the nozzle of the extruder may reach a value of, for example, 1000 l/sec, with the viscosity of the polymer melt in the extruder at this shear rate being about 1,200 Pa-sec.

FFF three-dimensional (3D) printing techniques differ from other three-dimensional (3D) printing in using a supportive structure, which may be retained or removed after the printed article is completed. (Other 3D printing methods may not have to use such supports.) The ability to use water-soluble thermoplastic composite materials (e.g., comprising water-soluble thermoplastic polymers) in the form of, for example, filaments, pellets, etc., may permit currently available FFF printers to form such supports. Such water-soluble thermoplastic materials may be altered (e.g., by chemically altering their structure, by using nanoscopic particulate processing aids, plasticizers, structural reinforcement materials, and/or other additives, etc.) to enable extrusion of such filaments under conventional conditions/settings used in such FFF printers. These water-soluble thermoplastic materials may be used alone for printing temporary (sacrificial) support structures such as molds, scaffolds, forms, constructs, etc., or may be co-printed together with other water-insoluble thermoplastic polymers by using printers employing multiple extruders, thus building the entire three-dimensional (3D) article in one continuous step. By using convenient post-processing, such as immersion/washing of the printed temporary (sacrificial) water-soluble support structure with water, the water soluble support structure which is not part of the final product may thus be easily removed.

For preparing printable water-soluble molds, scaffolds, forms, constructs, etc., soluble support materials previously available have included polyvinyl alcohol (PVA) and high impact polystyrene (HIPS) filaments. In the case of water-soluble molds, scaffolds, forms, constructs, etc., prepared from PVA filaments, significant soaking time in warm water and sometimes prolonged treatment in an ultrasonic bath may be required to remove the sacrificial PVA support structure, and even then it may not be possible to remove the sacrificial PVA support structure completely from minute cavities that may be desirable in a particular design. In the case of molds, scaffolds, forms, constructs, etc., prepared from HIPS filaments, the sacrificial HIPS support structure may have to be dissolved in limonene, making the use of sacrificial HIPS support structures inconvenient, as well as generating difficult to dispose of waste products.

Polyethylene oxide (PEO) polymers may provide an alternative material for preparing such sacrificial molds, scaffolds, forms, constructs, etc. PEO polymers may be non-toxic, biodegradable and readily water soluble at ambient temperature. For example, the immersion of such sacrificial support structures prepared from PEO polymers in water at ambient temperature may be sufficient for complete removal of the support structure from the remaining/residual three-dimensional (3D) article, object, part, etc., that is formed by using the water-soluble support structure.

However, higher molecular weight water-soluble PEO polymer resins may have very high melt viscosities, thus requiring higher temperatures and forces to make extrusion into filamentary forms feasible. Such higher temperatures required for these higher molecular weight water-soluble PEO polymer resins to have appropriate viscosities at shear rates attained in the extruder (as well as in the printer nozzle) may cause melt fracture and thermal degradation of these higher molecular weight PEO resins to occur, and thus potentially make them unfeasible for use in certain three-dimensional (3D) printing techniques. By contrast, lower molecular weight water-soluble PEO resins, which may exhibit appropriate melt viscosities as such temperatures, may not be processable into filamentary forms due to lower melt strength and lower melt elasticity.

Suitable materials for three-dimensional (3D) printing techniques may require certain viscoelastic properties, adjustment of the material's melt viscosity by chemical modification, and/or by inclusion of certain processing aids such as nanoscopic particulates, plasticizers, structural/reinforcement materials, etc. To obtain such suitable three-dimensional (3D) printable materials in embodiments of the present invention, a water-soluble thermoplastic polymer composite is provided which has a melt viscosity in the range of from about 100 to about 10,000 Pa-sec. (such as from about 1000 to about 5000 Pa-sec.) at a shear rate in the range of from about $1 \times 10^1$ to about $1 \times 10^4$ reciprocal seconds (such as from about $1 \times 10^1$ to about $1 \times 10^3$ reciprocal seconds). Embodiments of these water-soluble thermoplastic polymer composites according to the present invention having the indicated melt viscosities at these specified shear rates exhibit a melt strength and elasticity sufficient for preparing filaments, films, powders, pellets, etc., useful in various three-dimensional (3D) printing techniques, such as fused filament fabrication (FFF) techniques, selective laser sintering (SLS) techniques, inkjet 3D printing techniques, injection 3D molding techniques, etc.

In embodiments of the present invention, a water-soluble thermoplastic polymer composite is provided which includes a water-soluble PEO graft polymer which has a polyethylene oxide (PEO) polymer backbone (i.e., having an approximate molecular weight of at least about 4,000,000 g/mol., for example, from about 4,000,000 to about 8,000,000 g/mol., such as from about 6,750,000 to about 7,250,000 g/mol.). Engrafted onto this polyethylene oxide polymer backbone is one or more polar vinyl monomers such as, for example, 2-hydroxyethyl methacrylate (HEMA), poly(ethylene glycol)methacrylate (PEG-MA), etc. The amount of the polar vinyl monomer which may grafted onto this polyethylene oxide (PEO) polymer backbone may be in the range from about 0.05 to about 10% (such as from about 0.1 to about 5%) by weight of the PEO polymer backbone. (The use of lower molecular weights polar vinyl monomers such as HEMA and lower molecular weight PEG-MAs tend encourage faster grafting reactions.)

Such grafting of polar vinyl monomers onto this PEO polymer backbone may be initiated and propagated by catalyzed thermal (heat) activation through the use of thermal catalytic initiators to generate free radicals upon exposure of the monomers to elevated temperatures. (The amount of heat which may be needed for radical formation may be specific to the particular initiator used and would understood by those skilled in the polymerization art.) A wide range of compounds containing O—O, S—S or N=N bonds may be employed as such thermal initiators, for example, alkyl, dialkyl, diaryl, arylalkyl peroxides, such as t-butyl peroxide, di-t-butyl peroxide, cumyl peroxide, 1,1-di-t-butylperoxy) hexane; acyl peroxides, such as acetyl peroxides and benzoyl peroxides; hydroperoxides such as cumyl hydroperoxide, p-methane hydroperoxide etc.; peresters and peroxyesters such as t-butyl peroxypivalate, t-butyl perbenzoateetc.; alkylsulfonyl peroxides; dialkyl peroxymonocarbonates; dialkyl peroxycarbonates; ketone peroxides; azo compounds, such as 2,2'-azobisisobutyronitrile (AIBN), 1,1'-azobis(cyclohexanecarbonitrile); etc. Such catalyzed thermal activation grafting reactions may be carried out in a variety of reaction vessels or devices which enable controlled uniform heating and mixing of the contents, including, for example, single and double screw extruders (e.g., counter-rotating twin screw extruders), such as Helicone mixers, Brabender plasticorders, Haake extruders (Haake, Paramus, N.J.), co-rotating, twin-screw extruders such as ZSK-30 twin-screw extruders (Werner & Pfleiderer Corp, Ramsey, N.J.), as well as similar mixing devices.

In one such embodiment for preparing the PEO grafted polymer, a PEO polymer resin (e.g., PEO WSR 303) may be placed in a petri dish and the temperature raised to 180° C. while continuously mixing the PEO resin until a uniform melt is obtained. The polar vinyl monomer (e.g., HEMA at a weight ratio to the PEO resin of 1:20, or 5% by weight of the PEO resin) may then introduced and the resulting melt further mixed to insure uniform distribution (e.g., for 10 min.). Subsequently, a thermal initiator (e.g., 2,5-dimethyl-2,5-di(t-butylperoxy)hexane in a 1:20 weight ratio of initiator:HEMA) may added and the resulting mixture stirred at an elevated temperature of 180° C. for 40 min. to ensure completion of the reaction. The resulting molten mixture comprising predominantly grafted PEO polymer may then be unloaded, cooled, crushed and stored in a desiccator before further processing.

In some embodiments of the present invention, the water-soluble thermoplastic polymer composite may further include one or more nanoscopic particulate processing aids substantially uniformly dispersed in the PEO graft polymer, such as titanium dioxide ($TiO_2$) nanopowder, silica ($SiO_2$) nanopowder, alumina ($Al_2O_3$) nanopowder, fumed silica, nanopowders of other metal oxides such as zirconia, vanadia, chromia, antimony oxide, tin oxide, ceria, zinc oxide, etc., surface-modified nanoscopic particulates (e.g., surface-modified nanopowders), etc. The amount of nanoscopic particulate processing aids included may be in an amount of, for example, from about 0.05 to about 10% by weight of the polymer composite, such as from about 0.1 to about 5% by weight of the polymer composite. Such compositions may further optionally include one or more plasticizers in an amount of from about 0.1 to about 10% by weight of the polymer composite, such as from about 1 to about 5% by weight of the polymer composite.

In other embodiments of the present invention, the water-soluble thermoplastic polymer composite may include one or more structural reinforcement materials substantially uniformly dispersed in the PEO graft polymer such as carbon fibers, glass fibers, metal or metal oxide fibers, clay; talc, chalk, boron nitride, magnesium hydroxide, magnesium carbonate, diatomaceous earth, mica, glass quartz, ceramic and/or glass microbeads, spheres, etc., graphene, graphene nanoplatelets, graphene oxide, reduced graphene oxide, functionalized graphene, graphite, carbon black, etc., as well as one or more plasticizers substantially uniformly dispersed in the polymer composite such as triethyl citrate, triacetin, propylene glycol, dibutyl sebacate, glycerol monostearate, diethyl phthalate, crown ethers, etc. The amount of the one or more structural reinforcement materials included in may be from about 0.1 to about 20% by weight of the polymer composite, such as from about 5 to about 15% by weight of the polymer composite. The amount of the one or more plasticizers included in may be from about 0.1 to about 15% by weight of the polymer composite, such as from about 5 to about 10% by weight of the polymer composite. Such water-soluble thermoplastic polymer composites may further optionally include one or more high boiling solvents such as ethylene carbonate (EC), propylene carbonate (PC), diethyl carbonate (DEC), dimethyl carbonate (DMC), etc. In some embodiments of the present invention, and in addition to these structural reinforcement materials, these water-soluble thermoplastic polymer composites may also include the aforementioned nanoscopic particulate processing aids.

Figure 1:
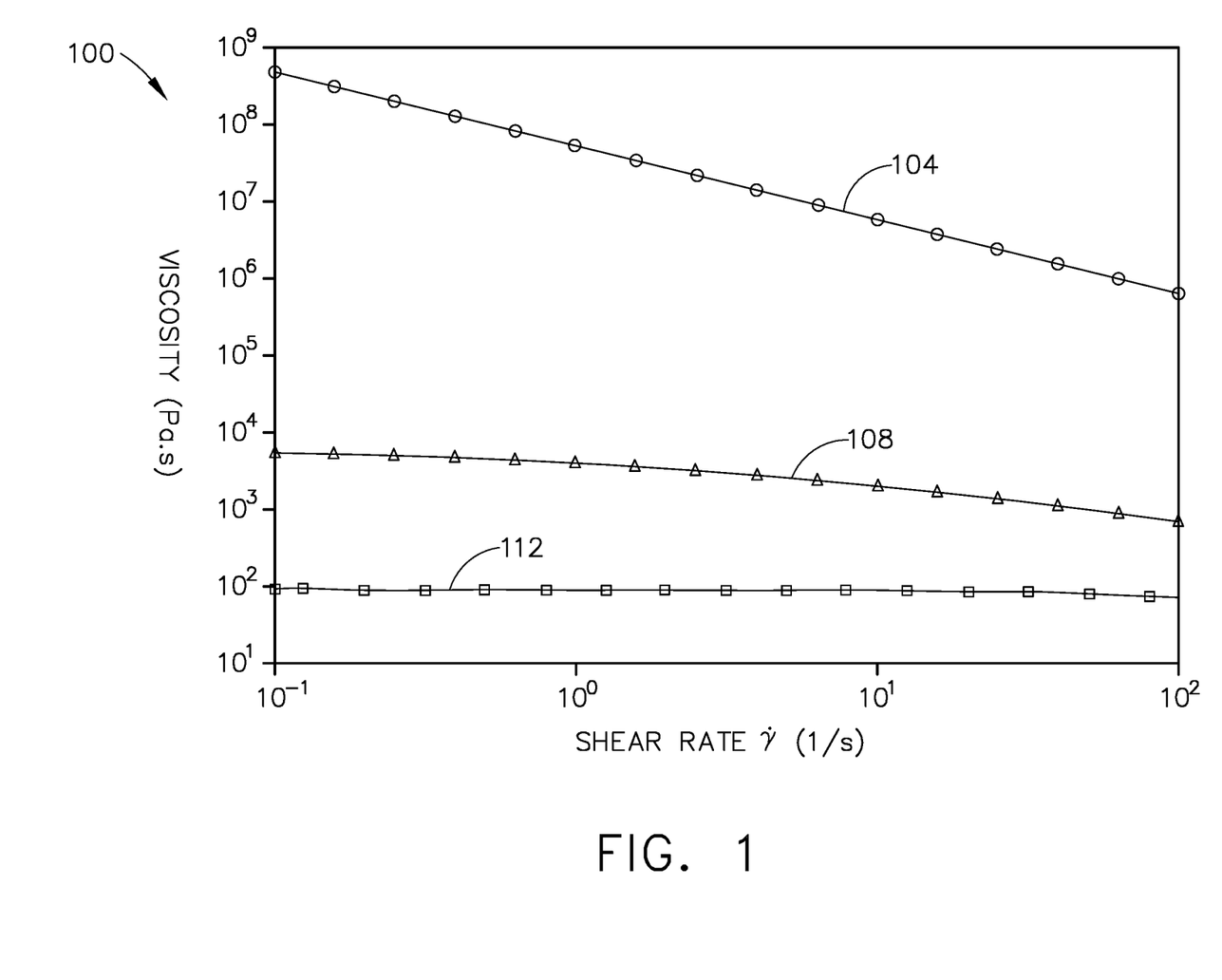
FIG. 1 is a graphical plot of melt viscosity versus shear rate for polyethylene oxide (PEO) polymer (WSR 303, approximate molecular weight of 7,000,000 g./mol.) as neat polymer, as a PEO polymer having grafted thereon 5% 2-hydroxyethyl methacrylate (HEMA), as well as the PEO HEMA grafted polymer to which is added a plasticizer (i.e., poly(ethylene glycol) dimethylether) and a nanoscopic particulate titanium dioxide processing aid to form a polymer composite.
Figure 2:
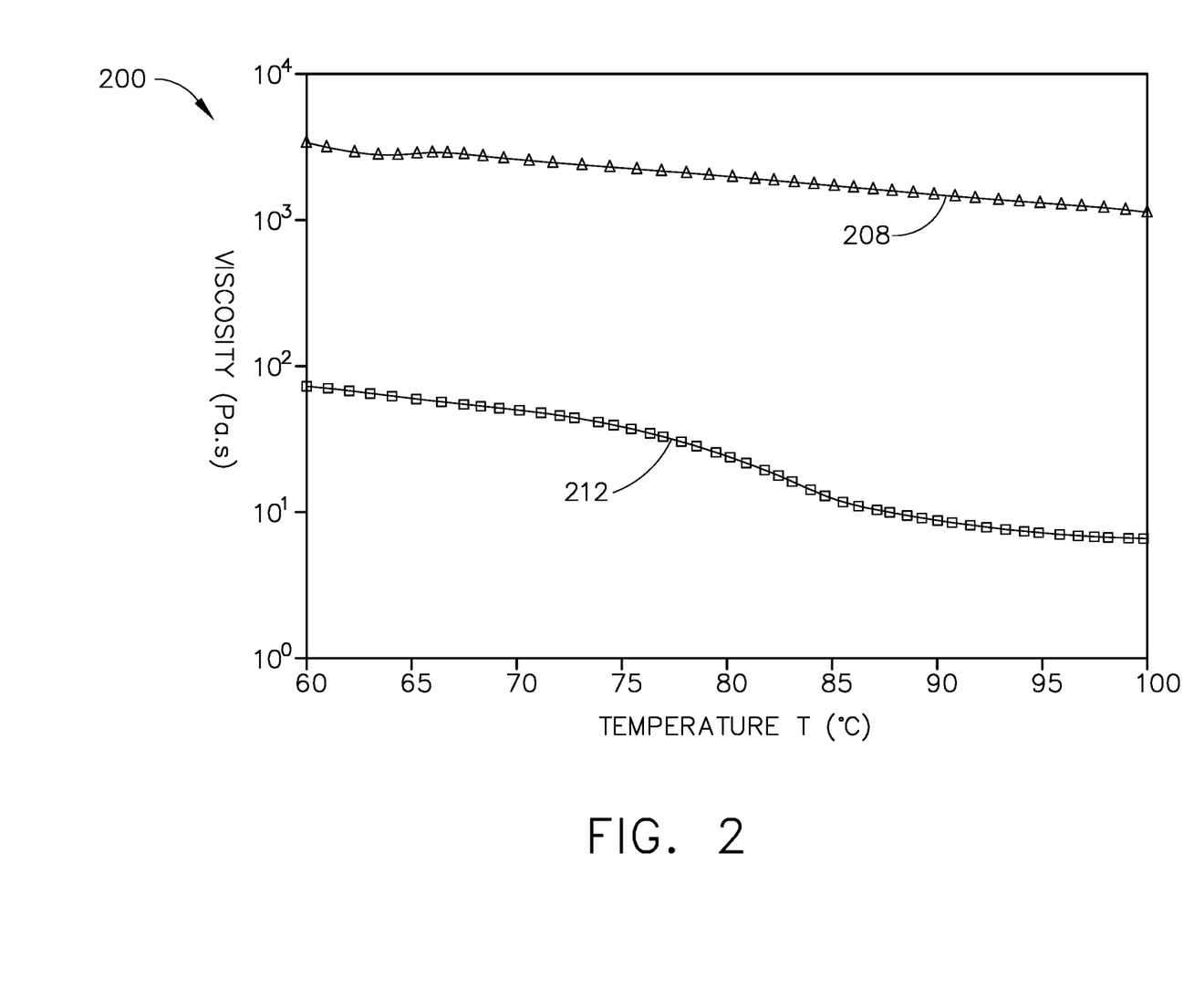
FIG. 2 is graphical plot of melt viscosity versus temperature of the grafted PEO HEMA grafted polymer only of FIG. 1, as well as the PEO HEMA grafted polymer to which is added the plasticizer and the nanoscopic particulate titanium dioxide processing aid of FIG. 1 to form a polymer composite.

The benefits in terms of melt viscosity, as well as other properties, of these water-soluble thermoplastic polymer composite compositions are illustrated by the graphical plots shown in FIGS. 1 and 2. FIG. 1 represents a graphical plot, indicated as 100, of three different compositions as function of melt viscosity versus shear rate: (a) a polyethylene oxide (PEO) polymer (WSR 303, approximate molecular weight 7,000,000 g./mol.) as the neat (unmodified) polymer, indicated by curve 104; (b) the same PEO polymer but having grafted thereon 5% 2-hydroxyethyl methacrylate (HEMA), indicated by curve 108; and (c) the PEO HEMA grafted polymer to which has been added plasticizer (i.e., poly (ethylene glycol) dimethylether in amount of 9.5% by weight the polymer composite composition) and nanoscopic particulate titanium dioxide (in an amount of 4.5% by weight the polymer composite composition) as processing aids to form the polymer composite composition, indicated by curve 112. As shown by curve 104, the neat PEO polymer has a relatively high melt viscosity which decreases essentially linearly as the shear rate increases, i.e., the melt viscosity is highly dependent on the shear rate. As shown by curve 108, the PEO HEMA grafted polymer has a much lower melt viscosity compared to that of the neat PEO polymer which is somewhat but less dependent on the shear rate. As shown by curve 112, the inclusion of the nanoscopic particulate titanium dioxide processing aid and plasticizer further lowers the melt viscosity which is even less dependent on the shear rate compared to the PEO HEMA grafted polymer only.

FIG. 2 represents a graphical plot, indicated as 200, of the PEO HEMA grafted polymer only of FIG. 1, as well as the PEO HEMA grafted polymer to which is added the plasticizer and nanoscopic particulate titanium dioxide processing aid of FIG. 1 to form the polymer composite composition. The respective melt viscosity versus temperature curves for the respective compositions are indicated as 208 for the PEO HEMA grafted polymer only, and as 212 for the PEO HEMA grafted polymer to which has been added the nanoscopic particulate processing aids and plasticizer. As shown by curves 208 and 212, the melt viscosity of the PEO HEMA grafted polymer only is relatively higher and less sensitive to increases in temperature compared to the PEO HEMA grafted polymer to which has been added the processing aids.

Embodiments of these water-soluble thermoplastic polymer composites of the present invention may be prepared by dissolving/suspending the PEO grafted polymer in a solvent (such as water, acetonitrile, etc.), along with the nanoscopic particulate processing aids, plasticizers, structural reinforcement materials, etc. In one such embodiment, a PEO grafted polymer may be dissolved in, for example, acetonitrile and a titanium dioxide nanopowder, along with poly(ethylene glycol) dimethyl ether (as the plasticizer) may be added. The amount of titanium dioxide nanopowder added may be in the range of from about 0.1 to about 20% (such as in the range of from about 5 to about 10%) by weight the polymer composite. The amount of plasticizer (which may be optionally included) added may be in the range of from about 0.1 to about 10% (such as in the range of from about 1 to about 10%) by weight the polymer composite. The resulting mixture may then be sonicated in ultrasonic bath for several hours to ensure complete dissolution of the PEO grafted polymer, as well as uniform distribution/dispersion of nanoscopic titanium dioxide powder/plasticizer. The resulting slurry may be poured into a tray and the solvent removed/allowed to evaporate, such as by a rotatory evaporator, etc. Upon removal of solvent the resulting polymer composite may be chopped up and stored in a container with a desiccant for subsequent processing.

In some embodiments, the solvent may be omitted and, after completion of the grafting reaction to form the PEO graft polymer, the remaining components such as the nanoscopic particulate processing aid, plasticizer, structural reinforcement materials, etc., may be directly introduced into a heated reaction vessel (such as Helicone mixer, Brabender plasticorder and similar heated reaction vessels capable of adequate heating and mixing melts) further modifying the PEO graft polymer in "one pot." The resulting thermoplastic polymer composite may then be poured into a tray, cooled, chopped and extruded, or may introduced as a molten thermoplastic polymer composite directly into the hopper of the extruder if faster processing is desired. In other embodiments, the compounding of the thermoplastic (extrudable) polymer composite may be achieved directly in an extruder that is used for filament production. The single and double screw extruders may be employed, with a double screw extruder to provide a more homogeneous distribution of the components in the molten bulk polymer composite.

In one embodiment, a water-soluble thermoplastic polymer composite comprising the PEO grafted polymer, nanoscopic particulate processing aid, optionally including a plasticizer, or comprising the PEO grafted polymer, structural reinforcement materials (e.g., carbon fibers, glass fibers, etc.), and plasticizer may be extruded on a Filabot extruder to provide a uniform filament having a diameter of 1.75 mm in diameter that may be air cooled and wound up on the spool.

Embodiments of the water-soluble thermoplastic polymer composites of the present invention may be extruded into filaments, films, etc., to provide, for example, sacrificial supports such as, casting molds, biological sacrificial supports, etc., by using, for example, FFF printers. These water-soluble thermoplastic polymer composites of the present invention may be used to just print such temporary (sacrificial) support structures such as molds, scaffolds, forms, constructs, etc., or may be co-printed together with other water-insoluble thermoplastic polymers (e.g., polyethylenes, polypropylenes, polystyrenes, polyamides such as nylon, polyurethanes, polyvinyl acetates, polyacrylates, polymethacrylates, polyesters, etc.) by using FFF printers employing multiple extruders, thus creating the desired three-dimensional (3D) article, object, part, etc., in one step. The sacrificial support structure co-printed with the water-insoluble thermoplastic polymer to form a water-insoluble three-dimensional article, object, part, etc., may then be removed (dissolved), for example, by immersion in water, rinsing, etc., to thus leave behind the intact three-dimensional (3D) article, object, part, etc., made from the water-insoluble thermoplastic polymer.

Embodiments of the water-soluble thermoplastic polymer composites of the present invention may also be extruded into filaments which have a plurality of segments wherein each pair of adjacent segments have at least one different feature and are arranged in a specific order. With such a filament, a fused filament fabrication (FFF) printer may carry out a pattern of printing which is synchronized with the order of the segments in such a filament to provide specified three-dimensional (3D) articles. See PCT Appln No. PCT/US15/11878 (Graphene 3d Lab Inc.), filed Jan. 17, 2015, the entire disclosure and contents of which is herein incorporated by reference, which describes such filaments, the preparation of such filaments, and the use of such filaments in fused filament fabrication (FFF) printer.

Embodiments of the present invention may also include preparing vapor sensors from these water-soluble thermoplastic polymer composites by such three-dimensional (3D) printing techniques. In preparing vapor sensors according to some embodiments, the structural/functional reinforcement materials may comprise a graphene-like material (e.g., one or more of functionalized or plasma treated graphene nanoplatelets; reduced or partially reduced graphene oxide; carbon fibers; carbon nanotubes; carbon black, etc.). For example, initially 4,4'-azobis(4-cyanopentanoyl dichloride) may be polycondensed with a different portion of the PEO polymer having terminal hydroxyl groups. The resulting polycondensed azo-PEO polymer may then be heated in the presence of the graphene-like material to cause decomposition, thus yielding nitrogen gas and PEO polymer radicals which may be trapped on the surface of the graphene-like material, thus forming graphene-like materials fractionally (i.e., randomly, sporadically, etc.) coated with PEO polymer. These graphene-like materials fractionally coated with PEO polymer may be subsequently combined with bulk PEO grafted polymer, plasticizer, and nanoscopic particulate processing aids to form the water-soluble thermoplastic polymer composite. This water-soluble thermoplastic polymer composite may then extruded, yielding filaments which may be used to print a vapor sensor by, for example, fused filament fabrication techniques. These filaments may also be pelletized, crushed or formed into powders for use in injection molding (3D) printing techniques. Alternatively, this water-soluble thermoplastic polymer composite may be formed into pellets, films, powders, etc., or may be suspended in a compatible solvent (such as acetonitrile, ethanol, etc.) and then used to ink-jet (3D) print such vapor sensors. In another embodiment, a vapor sensor filament may be obtained by a reactive extrusion wherein the azo-polymer (i.e., 4,4'-azobis(4-cyanopentanoyl dichloride) polycondensed with PEO polymer, as described above), may be introduced into the extruder along with the bulk PEO grafted polymer, graphene-like material, plasticizer, nanoscopic particulate processing aid, etc. Upon heating in the extruder, the polycondensed azo-PEO polymer may again be decomposed to form PEO polymer radicals which again may be trapped by the surface of the graphene material, thus yielding graphene-like materials fractionally coated with PEO polymer which are then substantially uniformly distributed in the bulk PEO grafted polymer composite to provide a vapor sensor-forming composition at the extruder exit. The electrical resistance of such composite may be increased, compared to the initial resistance, by exposure to solvent vapors of, for example, dichloromethane, chloroform, tetrahydrofuran, carbon tetrachloride, acetonitrile, alcohols, cyclohexane, etc., thus providing a signaling sensory output. The initial resistance of the composite that has been exposed to such solvent vapors may be substantially reestablished by subsequent exposure thereof to dry air. Such reversibility of electrical resistance may allow for multiple cycles of operation of a vapor sensor printed with such composites.

This application may incorporate material which is subject to copyright protection. The copyright owner has no objection to the facsimile reproduction by anyone of this application or any portion of this disclosure, as it appears in the Patent and Trademark Office patent/patent application file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the scope of the present invention should not be limited by any of the above described exemplary embodiments.

In addition, it should also be understood that any figures in the drawings that highlight any functionality and/or advantages, are presented herein for illustrative purposes only. The disclosed architecture is sufficiently flexible and configurable, such that it may be utilized in ways other than those that may be shown. For example, the steps listed in any flowchart may be re-ordered or only optionally used in some embodiments.

Further, the purpose of the Abstract of the Disclosure in this application is to enable the U.S. Patent and Trademark Office, as well as the public generally, including any scientists, engineers and practitioners in the art who are not familiar with patent or other legal terms or phraseology, to determine quickly from a cursory inspection the nature and essence of the technical disclosure of the application. Accordingly, while the Abstract of the Disclosure may be used to provide enablement for the following claims, it is not intended to be limiting as to the scope of those claims in any way.

Finally, it is the applicants' intent that only claims that include the express language "means for" or "step for" be interpreted under 35 U.S.C. § 112, paragraph 6. Claims that do not expressly include the phrase "means for" or "step for" are not to be interpreted as being within the purview of 35 U.S.C. § 112, paragraph 6.

The invention claimed is:

1. A method for preparing a three-dimensional article comprising:
   (a) providing a water-soluble thermoplastic polymer composite comprising:
      a water-soluble thermoplastic polyethylene oxide graft polymer having:
         a polyethylene oxide polymer backbone having molecular weight of at least 4,000,000 g/mol.; and
         from about 0.05 to about 10% by weight of the polyethylene oxide polymer backbone of at least one polar vinyl monomer grafted to the polyethylene oxide polymer backbone; and
      one or more nanoscopic particulate processing aids uniformly dispersed in the graft polymer in an amount of from about 0.05 to about 10% by weight of the water-soluble thermoplastic polymer composite;
      wherein the water-soluble thermoplastic polymer composite has a viscosity in the range of from about 100 to about 10,000 Pa-sec. when measured at a shear rate in the range of from about $1 \times 10^1$ to about $1 \times 10^4$ reciprocal seconds:
   (b) forming the water-soluble thermoplastic polymer composite of step (a) into a three-dimensional (3D) printable material for use in forming a sacrificial support;
   (c) forming a co-printed three-dimensional article by co-printing a water-insoluble thermoplastic polymer with the three-dimensional (3D) printable material of step (b), using a three-dimensional (3D) printing technique, wherein the co-printed three-dimensional article comprises the water-insoluble thermoplastic polymer and the sacrificial support formed from the three-dimensional (3D) printable material of step (b); and
   (d) removing the sacrificial support by immersing the co-printed three-dimensional (3D) article in water to dissolve the water-soluble thermoplastic polymer composite and to provide the three-dimensional (3D) article comprising the water-insoluble thermoplastic polymer without any of the water-soluble thermoplastic polymer composite;
   wherein water-soluble refers to at least one of a composite, composition, substance, and material that is soluble in that it melts, liquefies, dissolves, disintegrates, falls apart, or solubilizes when brought into contact with an aqueous fluid.

2. The method of claim 1, wherein the three-dimensional (3D) printable material of step (b) is in the form of a filament, film, powder, or pellet.

3. The method of claim 2, wherein the three-dimensional (3D) printable material of step (b) comprises a filament, and wherein step (c) is carried about by a fused filament fabrication (FFF) technique.

4. The method of claim 2, wherein the three-dimensional (3D) printable material of step (b) comprises a powder or pellet, and wherein step (c) is carried out by a selective laser sintering (SLS) technique.

5. The method of claim 2, wherein step (c) is carried out by an inkjet (3D) printing technique.

6. The method of claim 2, wherein step (c) is carried out by an injection molding (3D) printing technique.

7. The method of claim 1, wherein the one or more nanoscopic particulate processing aids of step (a) are one or more of: titanium dioxide nanopowder; alumina nanopowder; silica nanopowder; fumed silica; zirconia nanopowder; vanadia nanopowder; antimony oxide nanopowder; tin oxide nanopowder; ceria nanopowder; or zinc oxide nanopowder.

8. The method of claim 7, wherein the one or more nanoscopic particulate processing aids comprise titanium dioxide nanopowder.

9. The method of claim 7, where the polymer composite of step (a) further comprises one or more plasticizers in an amount of from about 0.1 to about 10% by weight of the polymer composite.

10. A method for preparing a three-dimensional article comprising:
    (a) providing a water-soluble thermoplastic polymer composite comprising:
        a water-soluble thermoplastic polyethylene oxide graft polymer having:
            a polyethylene oxide polymer backbone having an approximate molecular weight of at least 4,000,000 g/mol; and
            from about 0.05 to about 10% by weight of the polyethylene oxide polymer backbone of at least one polar vinyl monomer grafted to the polyethylene oxide polymer backbone;
        one or more structural reinforcement materials uniformly dispersed in the water-soluble thermoplastic polymer composite in an amount of from about 0.1 to about 20% by weight of the water-soluble thermoplastic polymer composite; and
        one or more plasticizers uniformly dispersed in the water-soluble thermoplastic polymer composite in an amount of from about 0.1 to about 15% by weight of the water-soluble thermoplastic polymer composite;
        wherein the water-soluble thermoplastic polymer composite has a melt viscosity in the range of from about 100 to about 10,000 Pa-sec. when measured at a shear rate in the range of from about $1 \times 10^1$ to about $1 \times 10^4$ reciprocal seconds;
    (b) forming the water-soluble thermoplastic polymer composite of step (a) into a three-dimensional (3D) printable material for use in forming a sacrificial support;
    (c) forming a co-printed three-dimensional article by co-printing a water-insoluble thermoplastic polymer with the three-dimensional (3D) printable material of step (b), by using a three-dimensional (3D) printing technique, wherein the co-printed three-dimensional article comprises the water-insoluble thermoplastic polymer and the sacrificial support formed from the three-dimensional (3D) printable material of step (b); and
    (d) removing the sacrificial support by immersing the co-printed three-dimensional (3D) article in water to dissolve the water-soluble thermoplastic polymer composite and to provide the three-dimensional (3D) article comprising the water-insoluble thermoplastic polymer without any of the water-soluble thermoplastic polymer composite;
    wherein water-soluble refers to at least one of a composite, composition, substance, and material that is soluble in that it melts, liquefies, dissolves, disintegrates, falls apart, or solubilizes when brought into contact with an aqueous fluid.

11. The method of claim 10, wherein the three-dimensional (3D) printable material of step (b) is in the form of a filament, film, powder, or pellet.

12. The method of claim 11, wherein the three-dimensional (3D) printable material of step (b) comprises a filament, and wherein step (c) is carried about by a fused filament fabrication (FFF) technique.

13. The method of claim 11, wherein the three-dimensional (3D) printable material of step (b) comprises a powder or pellet, and wherein step (c) is carried out by a selective laser sintering (SLS) technique.

14. The method of claim 11, wherein step (c) is carried out by an inkjet (3D) printing technique.

15. The method of claim 11, wherein step (c) is carried out by an injection molding (3D) printing technique.

16. The method of claim 10, wherein the one or more structural reinforcement materials comprise at least one of carbon fibers, carbon nanotubes, glass fibers, metal or metal oxide fibers, talc, chalk, boron nitride, magnesium hydroxide, magnesium carbonate, diatomaceous earth, mica, glass quartz, ceramic and/or glass microbeads or spheres, graphene, graphene nanoplatelets, graphene oxide, reduced graphene oxide, graphite, carbon black, and other graphene materials.

* * * * *